US012590603B2

(12) United States Patent
Beers et al.

(10) Patent No.: US 12,590,603 B2
(45) Date of Patent: Mar. 31, 2026

(54) JOURNAL BEARING HYBRID DAMPENING FOR INCREASED TEMPERATURE RANGE

(71) Applicant: Hamilton Sundstrand Corporation, Charlotte, NC (US)

(72) Inventors: Craig M. Beers, Wethersfield, CT (US); Brent J. Merritt, Southwick, MA (US); Paul M. Colson, Westfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 136 days.

(21) Appl. No.: 18/435,054

(22) Filed: Feb. 7, 2024

(65) Prior Publication Data

US 2025/0251018 A1 Aug. 7, 2025

(51) Int. Cl.
*F16C 27/06* (2006.01)
*F16C 17/02* (2006.01)

(52) U.S. Cl.
CPC ............ *F16C 27/063* (2013.01); *F16C 17/02* (2013.01)

(58) Field of Classification Search
CPC .......... F16C 17/02; F16C 27/02; F16C 27/06; F16C 27/063; F16C 27/066
See application file for complete search history.

(56) References Cited

U.S. PATENT DOCUMENTS

| | | | | |
|---|---|---|---|---|
| 5,235,227 | A * | 8/1993 | Fazekas | F16C 27/066 |
| | | | | 310/90 |
| 7,681,889 | B2 | 3/2010 | Tsuboi et al. | |
| 9,004,774 | B1 | 4/2015 | Delgado | |
| 10,570,775 | B2 | 2/2020 | Kouda et al. | |
| 11,268,396 | B2 | 3/2022 | Karkos et al. | |
| 2004/0195778 | A1 | 10/2004 | Smith et al. | |
| 2008/0292229 | A1 | 11/2008 | Dubreuil et al. | |
| 2009/0014678 | A1 | 1/2009 | Durham | |
| 2010/0019455 | A1 | 1/2010 | Kent et al. | |
| 2011/0081231 | A1 * | 4/2011 | Hoelzer | F04D 19/042 |
| | | | | 415/119 |
| 2017/0268674 | A1 | 9/2017 | Barbera et al. | |
| 2023/0234176 | A1 | 7/2023 | Kawase et al. | |
| 2024/0410422 | A1 * | 12/2024 | Kilchyk | F16C 32/0427 |

FOREIGN PATENT DOCUMENTS

JP 4622250 B2 11/2010

OTHER PUBLICATIONS

Extended European Search Report for EP Application No. 25156526.3, dated Jul. 3, 2025, 11 pages.

* cited by examiner

*Primary Examiner* — James Pilkington
(74) *Attorney, Agent, or Firm* — Kinney & Lange, P.A.

(57) ABSTRACT

A bearing system for a rotatable shaft includes a bearing shaft coaxial with the rotatable shaft, a bearing coaxial with the bearing shaft, a bearing housing surrounding the bearing and having a plurality of retention channels disposed axially along the bearing housing, and a dampening assembly comprising a plurality of circumferential seal elements disposed within each of the plurality of retention channels. A first subset of the plurality of seal elements is formed from a first material and a second subset of the plurality of seal elements is formed from a second material.

15 Claims, 3 Drawing Sheets

JOURNAL BEARING HYBRID DAMPENING FOR INCREASED TEMPERATURE RANGE

BACKGROUND

The present invention relates to turbomachinery, and more particularly to bearings for use in turbomachinery.

Conventional aircraft environmental control systems incorporate an air cycle machine, also referred to as an air cycle cooling machine, for cooling and dehumidifying air supplied to the aircraft cabin. Environmental control systems also utilize other turbomachinery including motor driven compressors and fans, and for simplicity, all forms of turbomachinery are referred as air cycle machines in this disclosure. Air cycle machines commonly include at least two turbines and a compressor spaced axially at intervals on a common shaft. The turbines and compressor are supported for rotation about the axis of the shaft by one or more bearing assemblies. O-rings can be used to control vibrations of the bearing assemblies, however, extreme operating temperatures can diminish dampening capabilities of both silicone and fluorocarbon O-rings. Thus, alternative dampening means are desirable.

SUMMARY

A bearing system for a rotatable shaft includes a bearing shaft coaxial with the rotatable shaft, a bearing coaxial with the bearing shaft, a bearing housing surrounding the bearing and having a plurality of retention channels disposed axially along the bearing housing, and a dampening assembly comprising a plurality of circumferential seal elements disposed within each of the plurality of retention channels. A first subset of the plurality of seal elements is formed from a first material and a second subset of the plurality of seal elements is formed from a second material.

An air cycle machine includes a tie shaft rotatable about an axis, and a bearing system supporting the tie shaft. The bearing system includes a bearing shaft coaxial with the rotatable shaft, a bearing coaxial with the bearing shaft, a bearing housing surrounding the bearing and having a plurality of retention channels disposed axially along the bearing housing, and a dampening assembly comprising a plurality of circumferential seal elements disposed within each of the plurality of retention channels. A first subset of the plurality of seal elements is formed from a first material and a second subset of the plurality of seal elements is formed from a second material.

Figure 1:
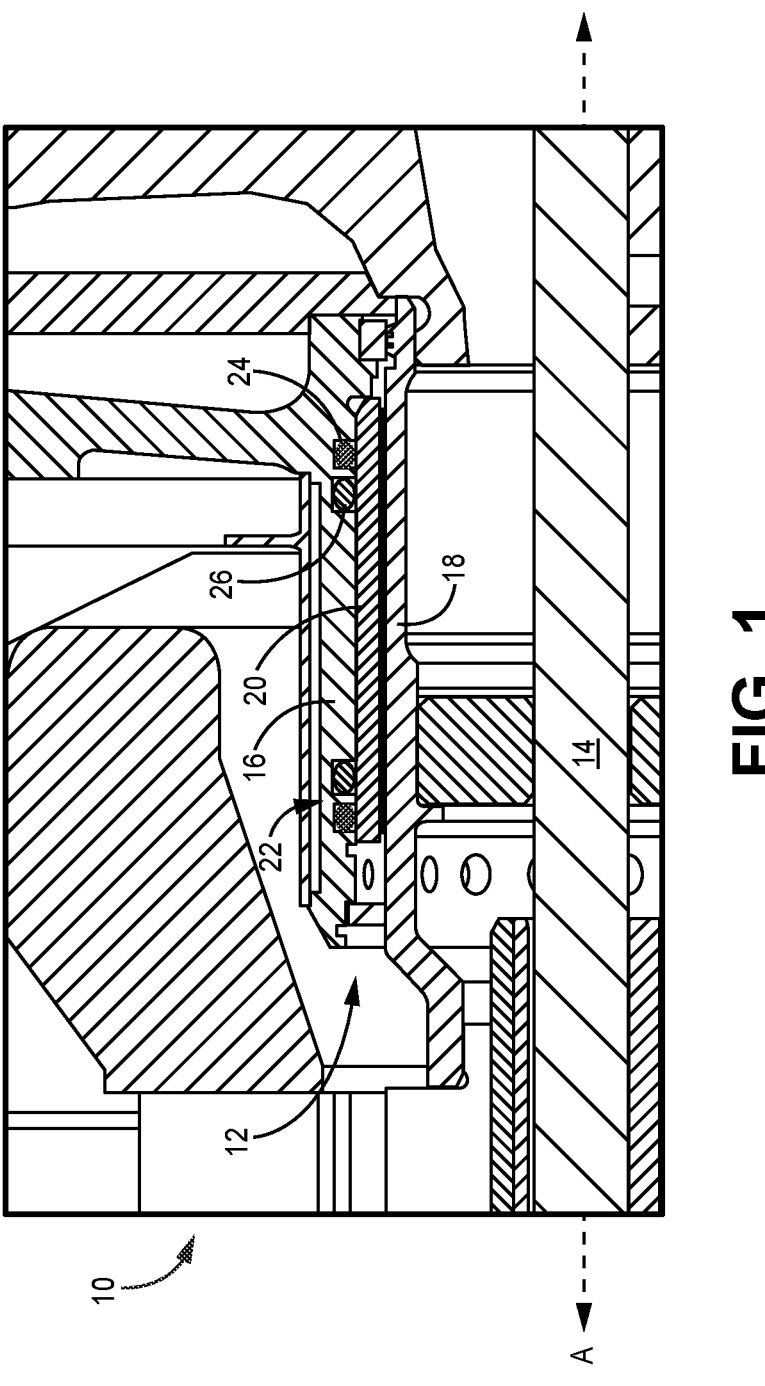
FIG. 1 is a cross-sectional illustration of an air cycle machine showing a bearing system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A hybrid dampening assembly for a bearing system is disclosed herein. The disclosed dampening assembly includes both silicone and fluorocarbon seal elements for maximizing performance of the dampening assembly across the operating temperature ranges of various rotational machinery, and further extending the life of the dampening assembly. The disclosed dampening system can be used in various types of bearing systems for rotational machinery.

FIG. 1 is a cross-sectional illustration of a portion of air cycle machine (ACM) 10, which can be incorporated into an environmental control system (ECS) of an aircraft. ACM 10 includes bearing system 12 for rotationally supporting tie rod 14 about rotational axis A. Bearing system 12 can include bearing housing 16, bearing shaft 18, and journal bearing 20 disposed between bearing housing 16 and bearing shaft 18. Journal bearing 20 can be a hydrodynamic fluid bearing in an exemplary embodiment. Bearing system 12 can further include hybrid dampening assembly 22 for dampening vibrations within bearing system 12. Dampening assembly 22 can include a first pair of seal elements 24 and a second pair of seal elements 26, each being configured as O-rings in an exemplary embodiment. Seal elements (i.e., O-rings) 24 and 26 can be disposed within bearing housing 16 and circumferentially about journal bearing 20.

Figure 2:
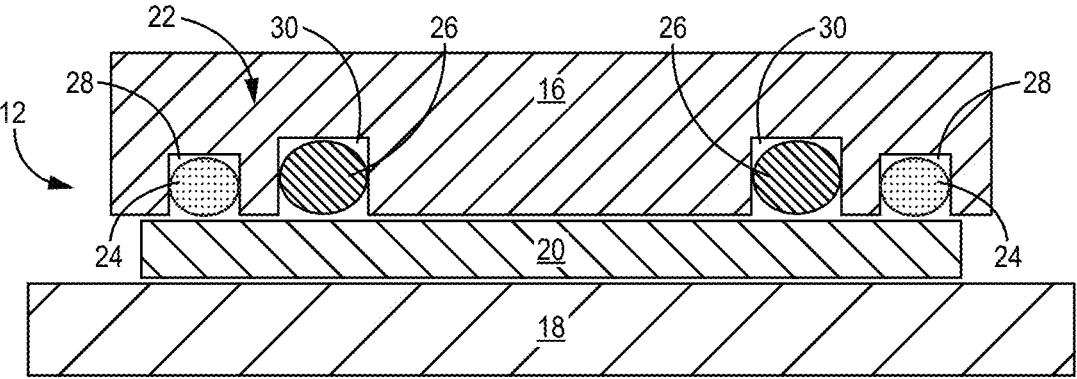
FIG. 2 is an enlarged schematic cross-sectional illustration of the bearing system of FIG. 1 showing a dampening assembly.
Figure 3:
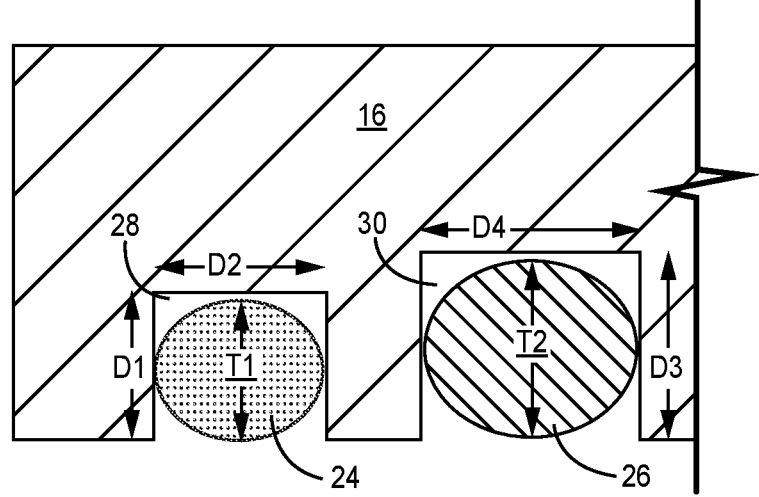
FIG. 3 is an enlarged schematic cross-sectional illustration of seal elements of the dampening assembly of FIG. 2.

FIG. 2 is a schematic, enlarged cross-sectional illustration showing dampening assembly 22 in greater detail. FIG. 3 is a schematic cross-sectional illustration of a portion of bearing housing 16 with individual seal elements 24 and 26. FIGS. 2 and 3 are discussed together.

The first pair of seal elements 24 can be disposed within first retention channels 28 formed within bearing housing 16. The second pair of seal elements can be disposed within second retention channels 30. As shown in FIG. 2, each seal element 24 can be situated adjacent/collocated with a seal element 26 within bearing housing 16, and can further be arranged such that seal elements 26 sit inboard of/are axially externally bounded by seal elements 24. In an alternative embodiment, seal elements 24 can sit inboard of seal elements 26, or seal elements 24 and 26 can be axially alternatingly disposed along bearing housing 16.

Seal elements 24 can be formed from silicone and be rated for temperatures ranging from −80° F. to 450° F. (roughly −62.2° C. to 232.2° C.), while seal elements 26 can be a fluorocarbon elastomer, and more specifically, a relatively high fluoride-containing elastomer, such as a Kalrez® or other similar perfluoroelastomer (FFKM) material. FFKM's can be rated for temperatures ranging from −65° F. (roughly −53.9° C.) to well above 450° F. Bearing system 12 can be exposed to temperatures as low as −65° F. (e.g., the cold soak temperature) and exceeding 400° F., especially if positioned near a motor, compressor outlet, or other source of high temperatures. Silicone performs well (i.e., maintain squeeze and dampening capabilities) at cold soak temperatures, but can suffer from thermal compression set (i.e., the retention of squeeze shape when no force is exerted) with continued exposure to temperatures above 400° F., thus reducing dampening capabilities of seal elements 24. Conversely, high fluoride-containing elastomers perform well above 400° F., but become stiff/lose squeeze starting at about 0° F. (roughly −17.8° C.). As such, the use of both silicone seal elements 24 and fluorocarbon seal elements 26 allow dampening assembly 22 to perform well across the range of temperatures (e.g., −65° F. to 450° F.) bearing system 12 is exposed to during the operation of ACM 10.

In order to optimize performance of dampening assembly 22, each seal element 26 can be configured with reduced squeeze compared to seal elements 24, as well as traditional fluorocarbon seal elements that might be used as the sole seal elements in a dampening assembly for a bearing system. Squeeze can be expressed as the extent of deformation expressed as a percentage of cross-sectional thickness of a seal element (e.g., seal element 26). The cross-sectional thicknesses T1 and T2 are labeled for each of seal element 24 and seal element 26, respectively, in FIG. 3. Seal element 26 squeeze can be reduced from about 5% to 15% for traditional fluorocarbon seal elements to about 3% to 10%. The reduced squeeze primarily addresses dampening performance of seal elements 26 when temperatures reach 0° F. and seal elements 26 become firm, by preventing stiffened seal elements 26 from inhibiting the rotation of journal bearing 20. Additionally, seal elements 26 help to extend the operating life of seal elements 24 and dampening assembly 22 by bearing a portion of the load on dampening assembly 22, especially at temperatures exceeding 400° F. The reduced load on seal elements 24 slows the rate of compression set of seal elements 24 as compared to other traditional bearing systems using solely silicone seal elements. Accordingly, dampening assembly 22 is distinguishable over those of traditional bearing systems which typically have only one pair of seal elements, formed from either silicone, or a reduced fluoride fluoroelastomer (FKM), such as Viton™, with upper temperature limits of only about 300° F. (roughly 148.9° C.).

First retention channels 28 can have a cross-sectional area defined by dimensions D1 and D2, and second retention channels 30 can have a cross-sectional area defined by dimensions D3 and D3. Either of dimensions D1 and D2 can be different from either of dimensions D3 and D4, and in an exemplary embodiment, at least one of D3 and D4 can be greater than either of D1 or D2, respectively. Bearing housing can include four retention channels—two first retention channels 28 and two second retention channels—as shown, but alternative embodiments can include fewer than four retention channels or more than four retention channels. This can be true if such alternative embodiment includes less than four total seal elements (e.g., three seal elements) or more than four total seal elements (e.g., five or six seal elements). The cross-sectional thickness T2 of seal element 26 can be greater than the cross-sectional thickness T1 of seal element 24, which can be a result of the difference in material and/or design of the respective seal elements, and/or as a result of the reduced squeeze of seal element 26.

Discussion of Possible Embodiments

The following are non-exclusive descriptions of possible embodiments of the present invention.

A bearing system for a rotatable shaft includes a bearing shaft coaxial with the rotatable shaft, a bearing coaxial with the bearing shaft, a bearing housing surrounding the bearing and having a plurality of retention channels disposed axially along the bearing housing, and a dampening assembly comprising a plurality of circumferential seal elements disposed within each of the plurality of retention channels. A first subset of the plurality of seal elements is formed from a first material and a second subset of the plurality of seal elements is formed from a second material.

The bearing system of the preceding paragraph can optionally include, additionally and/or alternatively, any one or more of the following features, configurations and/or additional components:

In the above bearing system, the bearing can be disposed between the bearing shaft and the bearing housing.

In any of the above bearing systems, the plurality of seal elements can include four seal elements.

In any of the above bearing systems, the first subset of the plurality of seal elements can include a first pair of seal elements.

In any of the above bearing systems, each of the first pair of seal elements can be formed from silicone.

In any of the above bearing systems, the second subset of the plurality of seal elements can include a second pair of seal elements.

In any of the above bearing systems, each of the second pair of seal elements can be formed from a fluorocarbon elastomer.

In any of the above bearing systems, the fluorocarbon elastomer can be a perfluoroelastomer.

In any of the above bearing systems, one of the first pair of seal elements can be disposed axially adjacent to one of the second pair of seal elements.

In any of the above bearing systems, one of the first and second pair of seal elements can be disposed axially inboard of the other of the first and second pair of seal elements.

In any of the above bearing systems, the plurality of retention channels can include four retention channels for retaining, respectively, each of the four seal elements.

In any of the above bearing systems, a cross-sectional thickness of one of the second pair of seal elements can be greater than a cross-sectional thickness of one of the first pair of seal elements.

In any of the above bearing systems, the rotatable shaft can be a tie shaft of an air cycle machine.

An air cycle machine includes a tie shaft rotatable about an axis, and a bearing system supporting the tie shaft. The bearing system includes a bearing shaft coaxial with the rotatable shaft, a bearing coaxial with the bearing shaft, a bearing housing surrounding the bearing and having a plurality of retention channels disposed axially along the bearing housing, and a dampening assembly comprising a plurality of circumferential seal elements disposed within each of the plurality of retention channels. A first subset of the plurality of seal elements is formed from a first material and a second subset of the plurality of seal elements is formed from a second material.

The air cycle machine of the preceding paragraph can optionally include, additionally and/or alternatively, any one or more of the following features, configurations and/or additional components:

In the above air cycle machine, the bearing can be disposed between the bearing shaft and the bearing housing.

In any of the above air cycle machines, the plurality of seal elements can include four seal elements.

In any of the above air cycle machines, the first subset of the plurality of seal elements can include a first pair of seal elements.

In any of the above air cycle machines, each of the first pair of seal elements can be formed from silicone.

In any of the above air cycle machines, the second subset of the plurality of seal elements can include a second pair of seal elements.

In any of the above air cycle machines, each of the second pair of seal elements can be formed from a fluorocarbon elastomer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing system for a rotatable shaft, the bearing system comprising:
    a bearing shaft coaxial with the rotatable shaft;
    a bearing coaxial with the bearing shaft;
    a bearing housing surrounding the bearing and having a plurality of retention channels disposed axially along the bearing housing; and
    a dampening assembly comprising a plurality of circumferential seal elements, the plurality of circumferential seal elements comprising separate respective seal elements disposed within each of the plurality of retention channels,
    wherein a first subset of the plurality of seal elements comprises a first pair of seal elements and is formed from silicone and a second subset of the plurality of seal elements comprises a second pair of seal elements and is formed from a fluorocarbon elastomer.

2. The bearing system of claim 1, wherein the bearing is disposed between the bearing shaft and the bearing housing.

3. The bearing system of claim 1, wherein the fluorocarbon elastomer is a perfluoroelastomer.

4. The bearing system of claim 1, wherein one of the first pair of seal elements is disposed axially adjacent to one of the second pair of seal elements.

5. The bearing system of claim 1, wherein one of the first and second pair of seal elements is disposed axially inboard of the other of the first and second pair of seal elements.

6. The bearing system of claim 1, wherein the plurality of retention channels comprises four retention channels for retaining, respectively, each of the four seal elements.

7. The bearing system of claim 1, wherein a cross-sectional thickness of one of the second pair of seal elements is greater than a cross-sectional thickness of one of the first pair of seal elements.

8. The bearing system of claim 1, wherein the rotatable shaft is a tie shaft of an air cycle machine.

9. An air cycle machine comprising:
    a tie shaft rotatable about an axis; and
    a bearing system supporting the tie shaft, the bearing system comprising:
        a bearing shaft coaxial with the tie shaft;
        a bearing coaxial with the bearing shaft;
        a bearing housing surrounding the bearing and having a plurality of retention channels disposed axially along the bearing housing; and
        a dampening assembly comprising a plurality of circumferential seal elements, the plurality of circumferential seal elements comprising separate respective seal elements disposed within each of the plurality of retention channels,
        wherein a first subset of the plurality of seal elements comprises a first pair of seal elements and is formed from silicone and a second subset of the plurality of seal elements comprises a second pair of seal elements and is formed from a fluorocarbon elastomer.

10. The air cycle machine of claim 9, wherein the bearing is disposed between the bearing shaft and the bearing housing.

11. The air cycle machine of claim 9, wherein the fluorocarbon elastomer is a perfluoroelastomer.

12. The air cycle machine of claim 9, wherein one of the first pair of seal elements is disposed axially adjacent to one of the second pair of seal elements.

13. The air cycle machine of claim 9, wherein one of the first and second pair of seal elements is disposed axially inboard of the other of the first and second pair of seal elements.

14. The air cycle machine of claim 9, wherein the plurality of retention channels comprises four retention channels for retaining, respectively, each of the four seal elements.

15. The air cycle machine of claim 9, wherein a cross-sectional thickness of one of the second pair of seal elements is greater than a cross-sectional thickness of one of the first pair of seal elements.

* * * * *